United States Patent
Janosik, Jr. et al.

(10) Patent No.: US 6,961,766 B2
(45) Date of Patent: Nov. 1, 2005

(54) METHOD FOR EXTRACTING PERSONALIZATION INFORMATION FROM WEB ACTIVITY

(75) Inventors: John Louis Janosik, Jr., Nashua, NH (US); David Lane Diamond, Merrimack, NH (US); Michael Rubino, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 660 days.

(21) Appl. No.: 09/841,280

(22) Filed: Apr. 24, 2001

(65) Prior Publication Data

US 2002/0156836 A1 Oct. 24, 2002

(51) Int. Cl.[7] ............................................. G06F 15/173
(52) U.S. Cl. ........................................ 709/224; 709/223
(58) Field of Search ................................ 709/223, 224

(56) References Cited

U.S. PATENT DOCUMENTS

| | | | | |
|---|---|---|---|---|
| 5,892,917 A | * | 4/1999 | Myerson | 709/224 |
| 6,018,619 A | * | 1/2000 | Allard et al. | 709/224 |
| 6,035,332 A | * | 3/2000 | Ingrassia et al. | 709/224 |
| 6,052,730 A | * | 4/2000 | Felciano et al. | 709/225 |
| 6,119,160 A | * | 9/2000 | Zhang et al. | 709/224 |
| 6,141,694 A | * | 10/2000 | Gardner | 709/240 |
| 6,286,046 B1 | * | 9/2001 | Bryant | 709/224 |
| 6,389,422 B1 | * | 5/2002 | Doi et al. | 707/10 |
| 6,466,970 B1 | * | 10/2002 | Lee et al. | 709/217 |
| 6,470,386 B1 | * | 10/2002 | Combar et al. | 709/224 |
| 6,535,916 B1 | * | 3/2003 | Nguyen | 709/224 |
| 6,564,342 B2 | * | 5/2003 | Landan | 714/48 |
| 6,567,849 B2 | * | 5/2003 | Ludovici et al. | 709/223 |
| 6,601,100 B2 | * | 7/2003 | Lee et al. | 709/226 |
| 6,651,099 B1 | * | 11/2003 | Dietz et al. | 709/224 |
| 6,668,273 B1 | * | 12/2003 | Rust | 709/204 |
| 6,701,363 B1 | * | 3/2004 | Chiu et al. | 709/224 |
| 6,795,888 B1 | * | 9/2004 | Apacible et al. | 711/1 |
| 6,804,701 B2 | * | 10/2004 | Muret et al. | 709/203 |
| 6,889,231 B1 | * | 5/2005 | Souder et al. | 707/104.1 |

* cited by examiner

Primary Examiner—Saleh Najjar
(74) Attorney, Agent, or Firm—Sanjay Prasad

(57) ABSTRACT

An Internet gateway server for dynamically loading a database with data extracted from selected header fields and the body of inbound and outbound HTTP messages exchanged between one or more servers and the Web browsers which connect with those servers. The gateway server or "WebJacket" is interposed in the communications pathway between the server(s) and client(s) receiving each of inbound messages from a client and forwarding the received inbound messages to the server(s). The WebJacket extracts a first selected set of data contained in predetermined ones of said inbound messages and storing this incoming message data in predetermined locations in a relational database. The WebJacket further receives, stores and forwards each outbound message from the server(s) and extracts a second selected set of data from the outbound messages. To speed performance, the WebJacket uses multithreaded processes to forward each message to its destination before or while the content of that message is being posted into the database. The specific information to be saved from each message, and the database location where it is to reside, is specified by configuration data accepted from a user in advance of handling the messages. When the message content is not sufficient to uniquely each client that initiated a given request/response exchange, client identification data in inserted into the outbound message in a "set-cookie" header instruction so that all messages to or from a given client may thereafter be identified. The configuration data identifies messages which already include cookie data which is adequate to identify the client.

12 Claims, 2 Drawing Sheets

METHOD FOR EXTRACTING PERSONALIZATION INFORMATION FROM WEB ACTIVITY

FIELD OF THE INVENTION

This invention relates to data communications systems and, more particularly, to methods and apparatus for storing and utilizing transaction data that includes data derived from the content of Hypertext Transport Protocol requests and responses.

BACKGROUND OF THE INVENTION

For a variety of reasons, it is frequently desirable to record and evaluate the large number of information requests and responses handled by the Web server(s) at a given Web site. For this reason, conventional Web servers normally include a mechanism for compiling a log file which records information on every received HTTP request, including the domain name of the remote host making the request, an identification of the remote user, the date and time of the request, the request line exactly as received, the status code returned to the client, and the length of the response returned. A number of publicly available log file analysis programs, as well as programs sold commercially such as netGenesis from netGenesis Corporation and WebTrends from WebTrends Corporation, provide mechanism for processing the log files produced by the server into a wide variety of management reports. In other cases, individual applications running on the Web server are programmed to record transaction information in a proprietary format which, while serving the needs of that application, is of little use to the Web site administrator concerned with the performance of the Web site as a whole.

There is a need, however, for a more robust mechanism for capturing data which describes selected desired content of individual request/response exchanges between Web browsers and Web servers independently of the data saved by individual applications or Web servers.

BRIEF SUMMARY OF THE INVENTION

In a principal aspect, the present invention takes the form of an Internet gateway server for dynamically extracting data extracted from the body and selected header fields of both inbound and outbound HTTP messages exchanged between one or more servers and the Web browsers which connect with those servers. The gateway server, here called a "WebJacket," is interposed in the communications pathway between the server(s) and client(s). The WebJacket receives each of the inbound messages from a client and forwards the received inbound messages to the server(s). The WebJacket extracts a first selected set of data contained in predetermined ones of these inbound messages and stores this incoming message data, preferably in predetermined locations in a relational database. The WebJacket further receives, stores and forwards each outbound message from the server(s) and extracts a second selected set of data from the outbound messages.

To speed performance, the WebJacket uses multithreaded processes to forward each message to its destination before or while the content of that message is being processed. The specific information to be saved from each message, and the database location where it is to reside, is specified by configuration data accepted in advance from the Web application administrator(s). When the message content is not sufficient to uniquely identify each client that initiated a given request/response exchange, client identification data is inserted into the outbound message in a "set-cookie" header instruction so that all messages to or from a given client may thereafter be identified. The configuration data identifies those messages which already include cookie data which is adequate to identify the client.

These and other features of the invention may be better understood by considering the following detailed description of the invention. In the course of this description, frequent reference will be made to the attached drawings.

DETAILED DESCRIPTION

The preferred embodiment of the present invention is implemented as an intermediate HTTP gateway positioned between the Web browsers from which request messages are received, and one or more Web servers which process those requests and return responses. A "browser" as that term is used here refers to any kind of user agent which sends HTTP request messages to and receives response messages from an HTTP server, and includes browsers, editors, spiders (web-traversing robots), or other end user tools. The term "server" and "Web server" as used herein means an application program that accepts connections in order to service HTTP request messages by sending back response messages. A "gateway," as that term is used here, refers to a server which is an intermediary for some other server and which, unlike a proxy, receives requests as if it were the origin server for the requested resource, such that the requesting client may not be aware that it is communicating with a gateway. The gateway contemplated by the present invention relays the request messages without changing their content, sending each request message unchanged to a destination server. This gateway will be referred to in this specification as a "Web Jacket," denoting the fact that it functions on behalf of, but is external to, the Web server The Web Jacket may send messages to a single server, or may act as a dispatcher, directing the inbound message to a selected one of a plurality of different servers. The Web Jacket also relays response messages from the Web server(s) back to the requesting browser; however, as will be described in more detail later, the Web Jacket may modify the header of selected response messages by adding one or more "set cookie" header statements to the outbound response.

Figure 1:
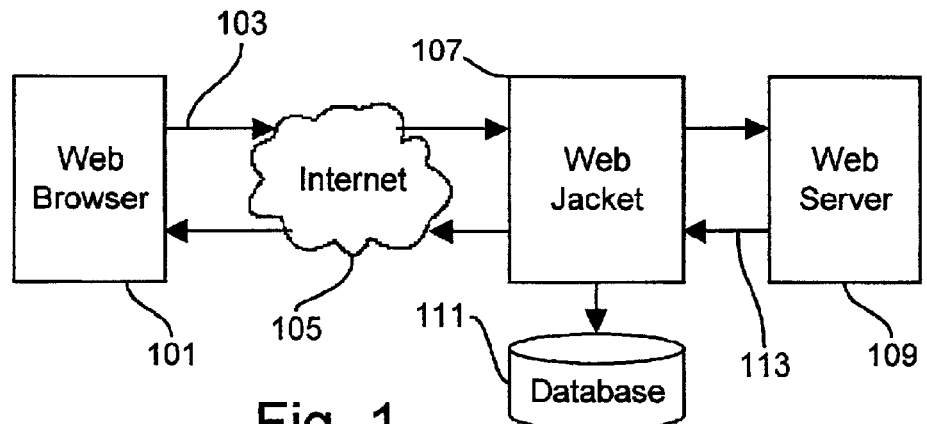
FIG. 1 is a block diagram illustrating the manner in which the gateway device contemplated by the invention is interposed between a Web browser and a Web server for storing message content data in a database.

FIG. 1 shows the message flow for a single request/response exchange. A remotely located Web browser 101 (for example, a Microsoft Internet Explorer or Netscape Navigator program executing on a PC connected to the Internet) transmits an HTTP request message 103 via the Internet 105 to the gateway 107 which implements the invention. The Web Jacket 107 forwards the inbound request message 103 from the remote browser 101 to the Web server 109 without changing its content. The Web Jacket 107 concurrently stores information about the request message in a database 111 which is preferably implemented by a relational database system that is also accessible to other programs. The Web server 109 processes the request message and returns a response 113 to the Web Jacket 107 which then relays the response 113 via the Internet 105 to the Web browser 101 while it concurrently stores information about the response 113 in the database 111.

HTTP Message Processing

The Web Jacket 107 processes request and response messages which are received and sent using the Hypertext Transfer Protocol (HTTP), an application-level protocol used by the World-Wide Web global information system. Version 1.1 (referred to as "HTTP/1.1") of that protocol is specified in the Internet Standards Track Request for Comment document RFC 2616, *Hypertext Transfer Protocol— HTTP/1.1* (June, 1999). The HTTP protocol is a request/response protocol. A client sends a request to the server in the form of a request method, URI, and protocol version, followed by a MIME-like message containing request modifiers, client information, and possible body content over a connection with a server. The server responds with a status line, including the message's protocol version and a success or error code, followed by a MIME-like message containing server information, entity meta-information, and possible entity-body content.

HTTP messages consist of requests from client to server and responses from server to client. Request and response messages use the generic Internet message format of defined in the Internet Standards Track Request for Comment document RFC 822, *Standard for The Format of ARPA Internet Text Messages* (August 1982) for transferring entities (the payload of the message). Both types of message consist of a start-line, zero or more header fields (also known as "headers"), an empty line (i.e., a line with nothing preceding the carriage-return, line feed characters) indicating the end of the header fields, and possibly a message-body.

Figure 2:
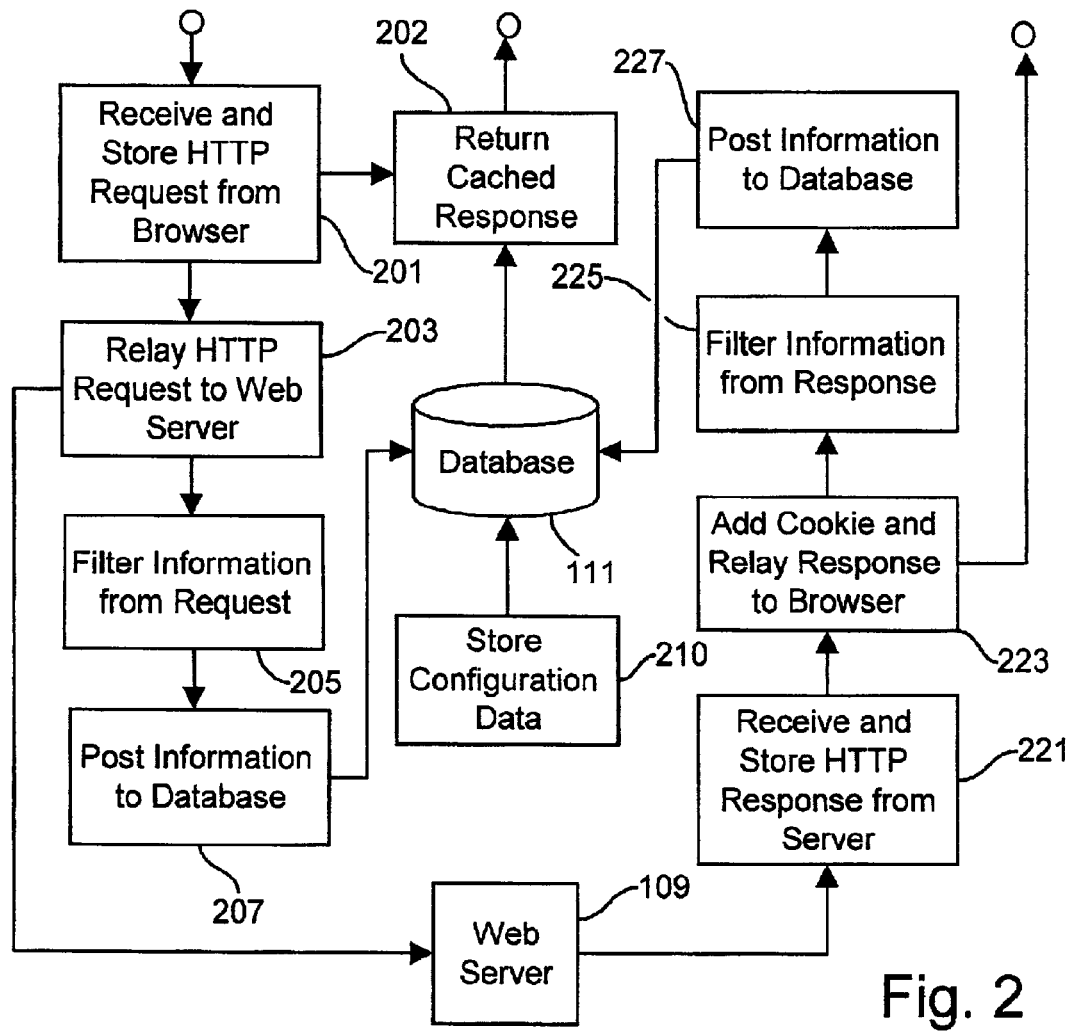
FIG. 2 is a data flow diagram illustrating the operation of the gateway device in more detail.

The functions performed by the Web Jacket 107 during a request/response exchange are illustrated in more detail in the data flow diagram seen in FIG. 2. The Web Jacket 107 receives inbound HTTP request messages as seen at 201. If the WebJacket identifies the inbound message as being a message which is to receive a cached response, it fetches data from the database 111 from which a previously sent response can be constructed, and transmits this cached response back to the requesting browser as indicated at 202, If there is no cached response to the message, the WebJacket immediately forwards the request message to the destination Web server 109 as indicated at 203. This store and forward operation is performed before (or concurrently with) the step of extracting (filtering) desired information from the request message at 205 and posting that information into the database 111 as shown at 207. In order to not to degrade the performance of the server 109, the process of extracting and saving the desired information from the inbound request message is performed after or while the request message is being forwarded to the Web server 109.

The nature of the filtering process is preferably configurable by the system administrator. To this end, configuration data is stored as seen at 210 (typically in the same database 111) by the configuration data to control the filtering which is performed thereafter by the Web Jacket. The WebJacket application provides a convenient GUI or Web form interface which makes it easy for Web application administrators to define the information that should be logged. The Web Jacket fetches the configuration data from the database to identify the information in the request message which is to be stored and to map that information into a corresponding schema for the extracted data in the database 111. The content of HTTP response messages, after being stored and forwarded to the Web browser as shown at 221 and 223 in FIG. 2, is also selectively extracted (filtered) in accordance with the configuration data posted at 210 as indicated at 225 and 227.

HTTP header fields include general-header, request-header, response-header, and entity-header fields which follow the same generic format specified in of RFC 822 noted above. Each header field consists of a name followed by a colon (":") and the field value. Field names are case-insensitive. The field value MAY be preceded by any amount "white space," but a single space is preferred. Header fields can be extended over multiple lines by preceding each extra line with at least one space or horizontal tab character. The order in which header fields with differing field names are received is not significant. However, it is "good practice" to send general-header fields first, followed by request-header or response-header fields, and ending with the entity-header fields. Multiple message-header fields with the same field-name MAY be present in a message if and only if the entire field-value for that header field is defined as a comma-separated list [i.e., #(values)]. It MUST be possible to combine the multiple header fields into one "fieldname: field-value" pair, without changing the semantics of the message, by appending each subsequent field-value to the first, each separated by a comma. The order in which header fields with the same field-name are received is therefore significant.

The configuration file loaded by the system administrator as indicated at 210 specifies each header field to be extracted and designates the location in a defined database schema which is to receive the content. Generally, it is not necessary to copy the field name from the header field since a one-to-one correspondence typically exists between the named field and a schema defined database location; hence the field name is implied. If desired, however, the configuration file permits a plurality of different fields to be concatenated and placed in a single database location defined by the schema and, in that event, the header field names are retained.

The message-body of an HTTP message is used to carry the entity-body associated with the request or response. The message-body differs from the entity-body only when a transfer-coding has been applied, as indicated by the Transfer-Encoding header field. Transfer-Encoding MUST be used to indicate any transfer-codings applied by an application to ensure safe and proper transfer of the message. Transfer-Encoding is a property of the message, not of the entity, and thus MAY be removed by the Web Jacket filtering process if so specified by the configuration file. When transfer-coding in not removed, the Transfer-Encoding header field content should be stored in the database for use by application which utilize the stored message data.

The rules determining when a message-body is allowed in a message differ for requests and responses. The presence of a message-body in a request is signaled by the inclusion of a Content-Length or Transfer-Encoding header field in the request's message-headers. A message-body MUST NOT be included in a request if the specification of the request method does not allow sending an entity-body in requests. For response messages, whether or not a message-body is included with a message is dependent on both the request method and the response status code. All responses to the HEAD request method MUST NOT include a message-body, even though the presence of entity-header fields might suggest that a message body is present. Except for designated response types, all other responses do include a message-body, although it MAY be of zero length.

Selected header fields provide information on the nature and content of the message body, including the header fields named: "Content-Encoding," "Content-Language," "Content-Length," "Content-Location," "Content-MD5," "Content-Range" and "Content-Type." The filtering process determined by the configuration file may condition the extraction of the message body into the database schema, or determine the location in the schema, based upon the values stored in these content description header fields.

Cookies

As noted earlier, the Web Jacket 107 forwards request messages without change to the Web server as seen at 203. Similarly, response messages from the Web server are forwarded "as is" to the Web browser, with one important exception. The Web Jacket 107 may insert "cookies" into the outbound response to identify sequences of messages exchanged with a particular browser.

The format for expressing cookies was defined in a preliminary specification, *Persistent Client State-HTTP Cookies* promulgated by Netscape Corporation and has been more recently specified in the Internet Standards Track Request for Comments RFC 2965, *HTTP State Management Mechanism* (October, 2000) which describes a way to create stateful sessions with HTTP requests and responses. HTTP servers typically respond to each client request without relating that request to previous or subsequent requests. The use of "cookies" provides a state management mechanism that allows clients and servers that wish to exchange state information to place HTTP requests and responses within a larger context, called a "session". This context is commonly used by applications to create, for example, a "shopping cart", in which user selections can be aggregated before purchase, or a magazine browsing system, in which a user's previous reading affects which offerings are presented.

Because different applications which utilize a Web server typically use cookies whose values are meaningful only to that application, while other applications make no use of cookies whatsoever, no unified mechanism typically exists for by which all traffic at a given server or collection of servers may be evaluated on a session basis, or which enables the activity of specific client browsers to be monitored over time with respect to all applications which are active at a Web site. To solve this problem, the Web Jacket may be configured, at the request of the system administrator, to automatically insert cookies into all or selected ones of the outbound response messages.

As specified by RFC 2965, two state management headers, Set-Cookie2 and Cookie, are used and both have common syntactic properties involving attribute-value (AV) pairs. Each AV pair consists of an attribute name and a value separated by an equal sign. The Web Jacket uses cookies to identify specific Web browsers and to identify sequences of exchanges with a single Web browser during a session. The Web Jacket initiates a session by inserting an extra "set cookie" header field in the outbound response message in a manner that is transparent to the Web Server. The Web browser then returns a Cookie request header to the Web Jacket which is passed to but ignored by the Web server, indicating that the Web browser chooses to continue the session initiated by the Web Jacket. Although the protocol permits the Web Jacket to send back to the Web browser a Set-Cookie2 response header with the same or different information, it need not (and normally does not) send another Set-Cookie2 header at all. Although the Web Jacket could end a session by sending the Web browser a Set-Cookie2 header with Max-Age=0, it normally has no reason to end any "session" since the primary goal is the identification of individual browsers rather than the monitoring of sessions as such. Said another way, the Web Jacket uses cookies to group all communications between a given Web browser and all applications which receive and respond to messages passing through the Web Jacket. Since shorter "sessions" are of concern to individual applications, those applications may, and frequently do, use their own cookie mechanism to monitor application specific sessions.

To uniquely identify individual Web browsers, cookies are inserted which have an attribute that is unique to the Web Jacket and an attribute value that is unique to the Web browser. Whenever the Web Jacket receives a cookie having the unique WebJacket attribute name, the attribute value is posted to the database as part of the request record and is also posted to the database as part of the response record. Whenever a request is received from a browser that does not include a cookie with the unique WebJacket attribute, a set-cookie header field is added to the outbound message specifying WebJacket attribute name and the next available unused identifier for that browser. A simple counter value which is incremented by one for each new browser that visits the site may be used to provide the unique browser identification as the value part of the inserted cookie.

The WebJacket may also be configured to recognize and use the cookie values used by applications, such as a customer identification number used by an online retail application. If no usable cookie is used by the application and identified by the configuration data, the WebJacket can then generate its own unique cookie and handle the cookie processing as noted above. With this information, both the web server and application administers can determine where users are spending time on the web site, permitting both application and site administrators to analyze and optimize the operation of the site.

Transparency to and Use by Applications and Servers

It is important to note that neither the Web server nor any application needs to be modified to enable the WebJacket to function as intended. Similarly, conventional Web browsers may be used with the system and need not be altered, reconfigured or provided with special plug-in or helper components.

Although applications do not have to change to enable the WebJacket to gather information, they may readily use the data. As contemplated by the invention, the WebJacket creates and dynamically maintains an accessible relational database which can be accessed by any application. When properly configured by the administrator to collect data which may be needed by a given application, the relational database may be used to access data on prior transactions to provide both message specific information, cumulative information about the content of message traffic with selected browsers, or any other information that might be desired that can be made available using the robust resources of the relational database. Unlike the data which the application can gather based on the message traffic it handles, the data gathered by the WebJacket makes available data from all Web site traffic in a unified database which can be of particular advantage when used, for example, in combination with Customer Relationship Management (CRM) systems.

The use of the Web jacket requires no new practices or training for Web application users (who are the source of request message data stored by the WebJacket) or Web application developers who use the log data to obtain information about web application users using conventional techniques that the existing relational database. Web application administrators need do nothing more than configure the WebJacket using a GUI or Web form interface.

System Architectures

The WebJacket is an application program that may execute on different or the same host as the Web server application, and the Web server application may in turn execute on a different host from the Web applications it handles.

The WebJacket is preferably a multithreaded application which permits the process of storing and forwarding the inbound or outbound message to proceed before or concurrently with the process that filters the message content in accordance with the configuration data, thereby insuring minimal impact to the throughput of the web application. Since the WebJacket will intercept all HTTP traffic, it must quickly determine which data to filter and which data to ignore. In order to minimize any impact on performance, threads to do the filtering are launched while the WebJacket goes about the business of forwarding the data.

Figure 3:
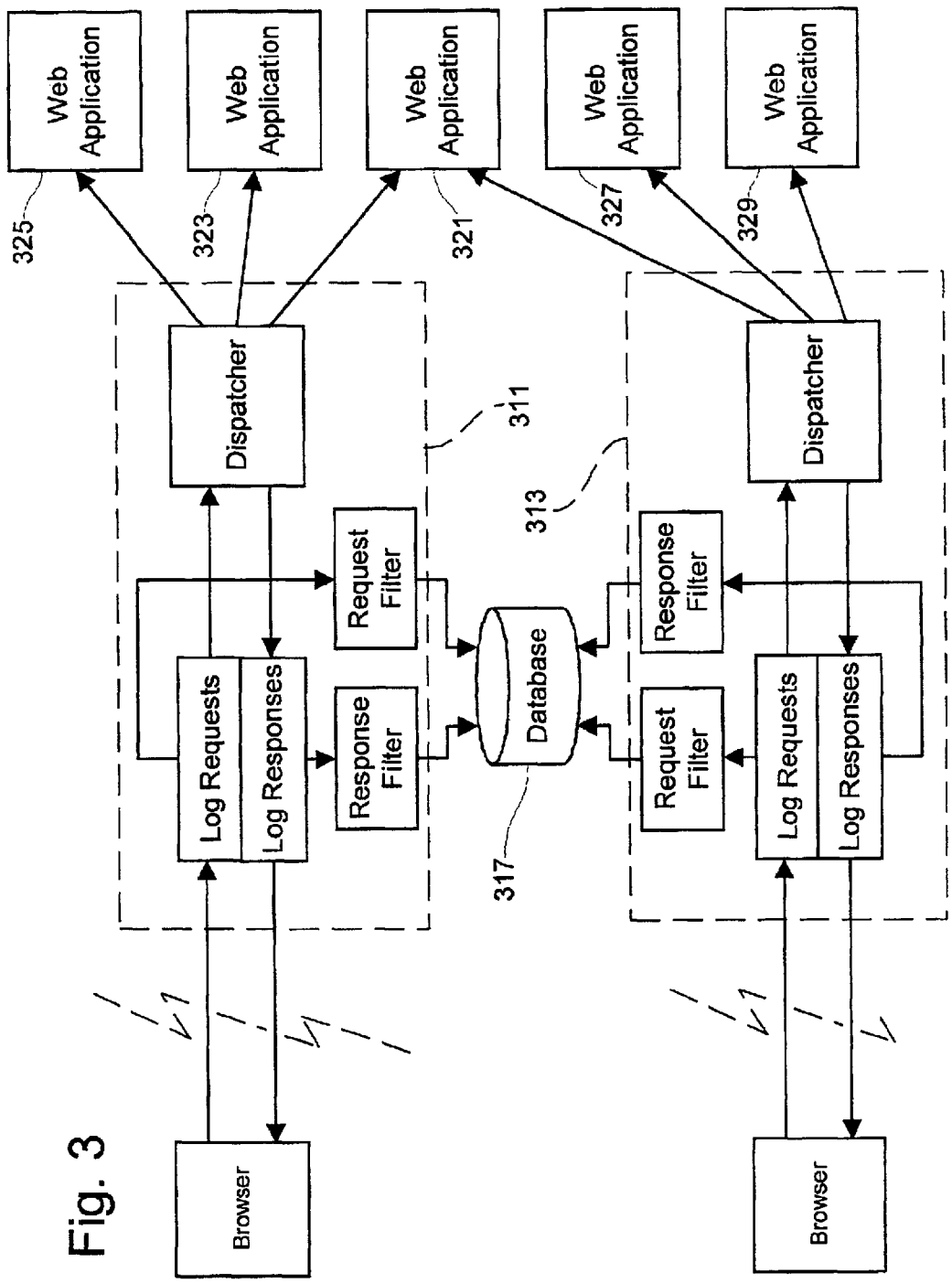
FIG. 3 is a block diagram illustrating how two or more instances of the gateway device may each serve several Web applications, and/or share the traffic flowing to and from a single Web application.

The WebJacket application may interact with the remainder of the system in a variety of ways. As illustrated in FIG. 3, two or more instances of the WebJacket application may execute concurrently as illustrated by the instances shown within the dashed line rectangles 311 and 313. These two instances share the same database 317 and may share the processing for a single application as illustrated at 321 in order to achieve load balancing.

Each WebJacket instance may be configured to serve as a dispatcher to balance HTTP request loads. Thus, as seen in FIG. 3, the WebJacket instance 311 handles Web applications 321, 323 and 325 while the WebJacket instance 313 handles Web applications 321, 327 and 329.

The WebJacket can be configured to store the entire content of response messages, allowing the WebJacket to act as cache. When so configured, the WebJacket responds to the inbound message by reassembling and returning the cached response message, without passing the request to the Web server, thereby reducing the load on the Web server. The WebJacket may also be configured to work with and utilize data stored by standard Web server log file builders, as well as standard log file analysis programs.

Conclusion

It is to be understood that the specific arrangements described above are merely illustrative examples of the manner in which the present invention may be used to gather and utilize data describing Web request/response information exchanges. Numerous modifications may be made to the methods and apparatus described above without departing from the true spirit and scope of the invention.

What is claimed is:

1. The method of gathering and storing in a relational database selected content extracted from inbound HTTP request messages sent to a Web server from remotely located Web browsers via the Internet, and further storing in said relational database selected content extracted from outbound HTTP response messages sent from said Web server to said remotely located Web browsers, said method comprising the steps of:

providing a gateway server coupled to said relational database and interposed in the communications pathway between said Web server and the Internet and utilizing said gateway server to perform the steps of:

receiving each of said inbound request messages from one of said Web browsers and forwarding each of said inbound request messages to said Web server, extracting a first selected set of data contained in predetermined request data fields in each of said inbound request messages and storing said first set of data in corresponding addressable request data storage locations in said relational database, said request data storage locations being defined by schema for said relational database, receiving each of said outbound response messages from said Web server and forwarding each such outbound response message to one of said Web browsers, extracting a second selected set of data contained in predetermined response data fields in each or said outbound response messages and storing said second set of data in corresponding addressable response data storage locations defined by a schema for said relational database, whereby said relational database is populated with information which describes the past use of said server.

2. The method set forth in claim 1 wherein said step of receiving and forwarding each of said inbound request messages is performed before or concurrently with said step of extracting data contained in predetermined ones of said inbound request messages.

3. The method set forth in claim 2 wherein said step of receiving and forwarding each of said outbound messages is performed before or concurrently with said step of extracting data contained in predetermined ones of said outbound messages.

4. The method set forth in claim 1 further including the step of accepting configuration data which identifies said predetermined request data fields and said predetermined response data fields containing said first and said second sets of data.

5. The method set forth in claim 1 further including the step of accepting configuration data which identifies said predetermined request data fields and said corresponding request data storage locations, and which further identifies said predetermined response data fields and said corresponding response data storage locations.

6. The method set forth in claim 1 wherein said step of receiving each of said inbound messages from a client and forwarding said inbound messages to said server includes the step of forwarding selected ones of said inbound messages to a second server, and wherein the step of receiving outbound messages from said server includes the step of receiving outbound messages from said second server.

7. The method set forth in claim 1 wherein said step of receiving each of said outbound messages from said server and forwarding each such outbound message to a client includes the step of inserting client identification data into said outbound message before said outbound message is forwarded to said client.

8. The method set forth in claim 7 further including the step of accepting cookie configuration data from a user, and wherein said step of inserting client information into said outgoing method is performed only on selected messages identified by said cookie configuration data.

9. Apparatus for transferring data to a relational database from HTTP request and response messages exchanged via the Internet comprising, in combination:

A Web server connected to the Internet for receiving HTTP request messages via the Internet and returning HTTP response messages via the Internet, a Web browser connected to the Internet for sending HTTP request messages to said Web server via the Internet and for receiving HTTP response messages from said Web server via the Internet, each of said HTTP request messages and each of said HTTP response messages including a plurality of named fields containing data; and a gateway server for transferring data from said request and response messages to said relational database, said gateway server being connected to relay said HTTP request messages from said Web browser to said Web server without changing their content and further being connected to relay said HTTP response messages from said Web server back to said Web browser, said gateway server including means for extracting field data from said named fields of said HTTP request and response messages and posting said field data into corresponding storage locations designated to receive said field data extracted from said named fields, said corresponding storage locations being defined by a schema for said relational database.

10. Apparatus for transferring data to a relational database from HTTP request and response messages exchanged via the Internet as set forth in claim 9 wherein said gateway server further includes means for generating cached HTTP response messages in response to selected ones of said HTTP request messages by retrieving cached data from said relational database that was previously extracted from previously relayed HTTP response messages, including means for forming said HTTP cached response messages from said cached data, and for returning said HTTP cached response messages via the Internet to the Web browsers that transmitted said selected ones of said HTTP request messages.

11. Apparatus for transferring data to a relational database from HTTP request and response messages exchanged via the Internet as set forth in claim 9 further comprising an interface for accepting configuration data from an administrator that specifies said named fields of said HTTP messages from which said field data is to be extracted and further designates said corresponding storage locations which are to receive said field data from said named fields.

12. Apparatus for transferring data to a relational database from HTTP request and response messages exchanged via the Internet as set forth in claim 11 wherein said gateway server further includes means generating cached HTTP response messages in response to selected ones of said HTTP request messages by retrieving cached data from said relational database that was previously extracted from previously relayed HTTP response messages, including means for forming said HTTP cached response messages from said cached data, and for returning said HTTP cached response messages to the Web browsers that transmitted said selected ones of said HTTP request messages.

* * * * *

UNITED STATES PATENT AND TRADEMARK OFFICE
CERTIFICATE OF CORRECTION

PATENT NO. : 6,961,766 B2  Page 1 of 1
APPLICATION NO. : 09/841280
DATED : November 1, 2005
INVENTOR(S) : Janosik, Jr. et al.

It is certified that error appears in the above-identified patent and that said Letters Patent is hereby corrected as shown below:

On face page, in field 57, in column 2, in "Abstract", line 24, delete "in" and insert -- is --, therefor.

In column 4, line 25, delete ""fieldname:" and insert -- "field-name: --, therefor.

In column 8, line 4, in claim 1, after "by" insert -- a --.

In column 8, line 10, in claim 1, delete "or" and insert -- of --, therefor.

Signed and Sealed this

Sixteenth Day of March, 2010

David J. Kappos
*Director of the United States Patent and Trademark Office*